(12) United States Patent
Verga

(10) Patent No.: US 6,782,118 B2
(45) Date of Patent: Aug. 24, 2004

(54) SYSTEM FOR MEASURING, SUBSTANTIALLY INSTANTANEOUSLY, THE DISTANCE AND TRAJECTORY TRAVELED BY A BODY IN FLIGHT DURING SPORTS COMPETITIONS

(75) Inventor: Antonio Verga, Milan (IT)

(73) Assignee: Seiko Epson Corporation, Tokyo (JP)

( * ) Notice: Subject to any disclaimer, the term of this patent is extended or adjusted under 35 U.S.C. 154(b) by 709 days.

(21) Appl. No.: 09/742,555

(22) Filed: Dec. 20, 2000

(65) Prior Publication Data

US 2001/0048754 A1 Dec. 6, 2001

(30) Foreign Application Priority Data

May 24, 2000 (EP) ............................................ 00830375

(51) Int. Cl.[7] ................................................. G06K 9/00
(52) U.S. Cl. ....................... 382/106; 348/139; 348/140; 348/142; 348/144; 356/3.16; 356/4.06; 473/190; 473/199; 473/468; 382/103; 382/107
(58) Field of Search ......................... 382/103, 106–107; 473/190–199, 468; 348/135–142, 144; 356/3.13, 3.16, 4.06–4.07

(56) References Cited

U.S. PATENT DOCUMENTS 4,545,576 A    10/1985  Harris
5,290,037 A  *  3/1994  Witler et al. ................. 473/199
5,446,701 A  *  8/1995  Utke et al. .................... 367/118
5,598,355 A  *  1/1997  Derou et al. ................. 342/159
5,662,325 A  *  9/1997  Weyand ..................... 273/138.1
5,768,151 A  *  6/1998  Lowy et al. .................... 463/2
6,304,665 B1 * 10/2001  Cavallaro et al. ........... 382/106
6,373,508 B1 *  4/2002  Moengen ..................... 345/848

FOREIGN PATENT DOCUMENTS

| DE | 27 00 615  | 7/1978 |
| DE | 27 05 486  | 8/1978 |
| DE | 41 41 397  | 6/1993 |
| JP | 08-117381  | 5/1996 |
| JP | 09-206418  | 8/1997 |
| WO | 97/28856   | 8/1997 |

* cited by examiner

Primary Examiner—Bhavesh M. Mehta
Assistant Examiner—Gregory Desire
(74) Attorney, Agent, or Firm—Mark P. Watson

(57) ABSTRACT

A system for measuring the distance traveled by bodies in flight during sports events, the bodies executing trajectories having a common predetermined take-off area, and a variable landing point within a landing surface. The system includes a fixed image acquisition device positioned at a predetermined distance from the take-off area for acquiring the image of the landing surface, a recorder for recording the landing surface image at least from the moment of initiation of the flight to completion of the flight, an identifying device for identifying a landing point of the body within the landing surface, and a calculating device for calculating the distance of the landing point from the take-off area.

6 Claims, 4 Drawing Sheets

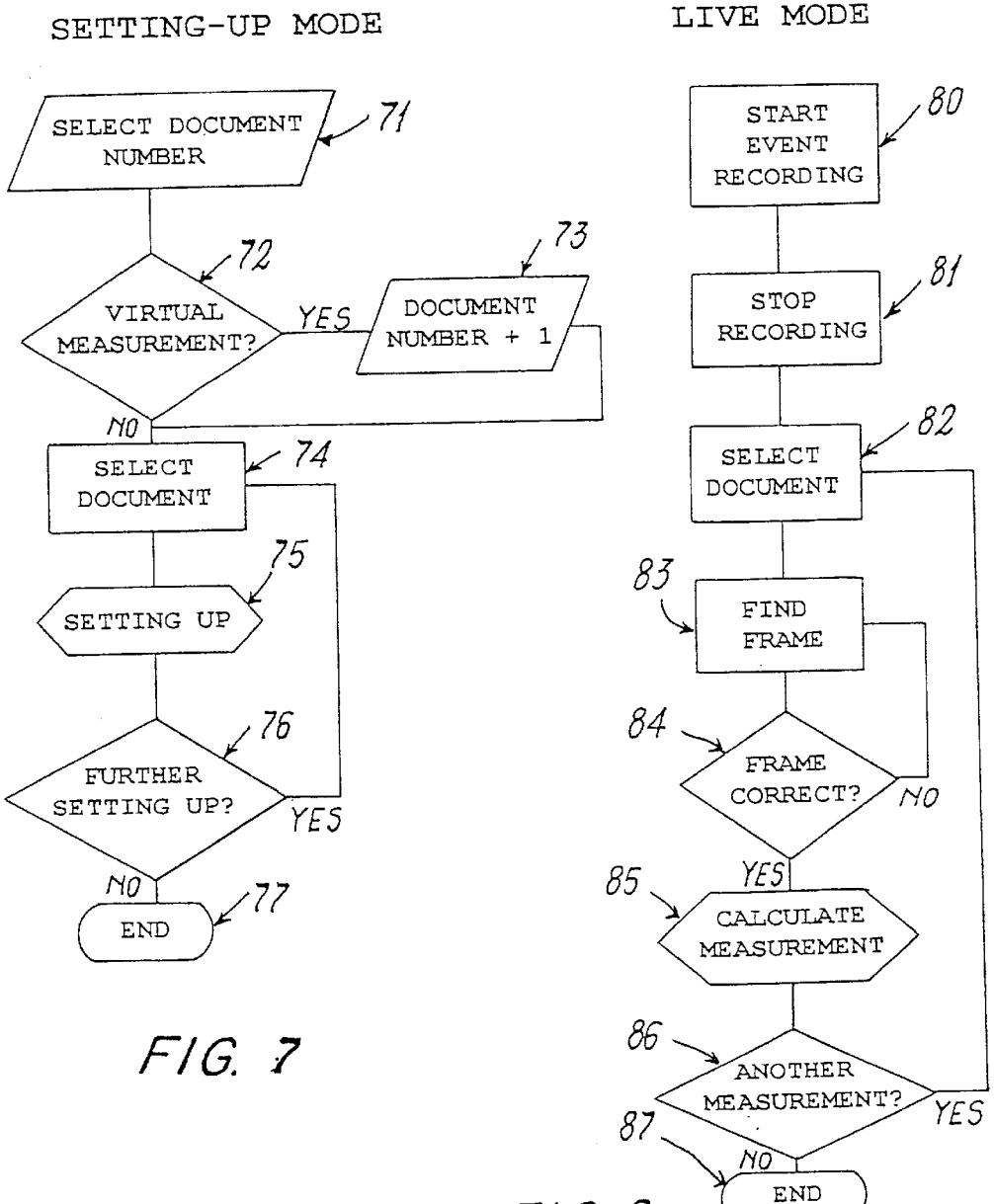

SYSTEM FOR MEASURING, SUBSTANTIALLY INSTANTANEOUSLY, THE DISTANCE AND TRAJECTORY TRAVELED BY A BODY IN FLIGHT DURING SPORTS COMPETITIONS

BACKGROUND OF THE INVENTION

1. Field of the Invention

This invention relates to a system for measuring distances and trajectories of people or objects traveled in sports activities, such as athletics or golf.

2. Description of the Related Art

With reference, for example, to the athletic events of shot putting, discus, hammer and javelin throwing, long jump and triple jump, a body (defined by an implement, such as the discus, or by the athlete himself) undergoes a substantially parabolic flight between a take-off area and a landing area. The flight take-off area can be a take-off board positioned at the end of an acceleration path (as in the case of the long jump and triple jump, in which at one end of this board there is a band of yieldable material or plasticine indicator), a board, for example of circular shape (as for hammer throwing), or an acceleration track bounded by a non-passable edge (as for javelin throwing). The landing area is provided on a surface the extent of which varies according to the type of athletics event, such surface being either compact (such as for the landing of an implement) or yieldable, with sand (such as the usual pit used in the long or triple jump).

After the body has landed, the distance between the point of impact and the point of take-off is measured to determine the propelled distance for the body and suitably displayed on an appropriate known display unit.

Depending on the type of propulsion (throw or jump), such measurement can be effected principally with two different instruments, namely a tape measure or a theodolite. However, the use of these measuring devices involves various problems. For example, measurement by a tape measure is not precise because of the instability of the tape measure, which tends to become twisted. There is hence a loss of linearity of the tape measure and the possibility of an incorrect measurement.

Even though the use of a theodolite (for example a tachometer) enables more accurate measurement, it does not guarantee exact precision. Its use requires positioning a measurement member, for example an electronic tachometer, outside the landing surface, and positioning a reflecting element within it. The distance that the body has been thrown or has jumped is measured by triangulation between the landing point, the tachometer position point, and the starting point (which can be arbitrary or virtual, such as the center of the shot putting board) of the body undergoing the trajectory.

This measurement may, however, not be absolutely correct. In this respect, the use of this instrument requires a reflector element to be positioned exactly at the impact mark, and maintained perfectly perpendicular to the landing surface. In addition using a theodolite with a reflecting element positioned on a yieldable surface (of sand) inevitably makes it difficult to obtain and maintain the correct measurement position. The use of a theodolite also device that the competition judge making the measurement must be trained in its use. The instrument is also expensive. Finally, the instrument must be reset after each group of jumps or throws.

OBJECTS OF THE INVENTION

An object of this invention is therefore to provide a system for correctly measuring the propelled distance of a body in a sports event in which the body follows an aerial trajectory between a take-off area and a landing area, and immediately displaying the measured value on termination of the trajectory.

A further object is to enable the trajectory to be verified three-dimensionally after its termination, in order, for example, to enable it to be described or be compared with other previous trajectories or with an ideal trajectory.

A further object is to provide a system of the stated type that provides constant results, which always provides correct measurements, and which requires no specialization by personnel (event judges) controlling the progress of the competition.

A further object is to provide a system of the stated type that can be used in any event, in which a body (athlete or sports implement) jumps or is thrown (through an aerial trajectory).

SUMMARY OF THE INVENTION

The present invention measures the distance and trajectory traveled by bodies in flight during sports events such as athletics, for example a shot, a discus or javelin, or the athlete himself when executing a long jump. The bodies executing trajectories having a common predetermined take-off area, and a landing point variable within a landing surface.

The system of the present invention includes a fixed image acquisition device, such as a video camera for acquiring the image of the landing surface and positioned at a predetermined distance from the take-off area. Also included is a recorder, such as a digital recorder, for recording the image or the body in flight, at least from the moment of initiation of the flight to its completion. The present invention further includes a device for identifying the landing point of the body within the landing surface. This device may be, for example, a cursor movable on a calculation area matrix present on a monitor. The cursor can be positioned on the landing point of the body that has undergone the aerial trajectory.

The system of the present invention further includes a calculating device, such as a microprocessor, for calculating the distance of the landing point from the take-off area. Preferably, a display unit displays the result of the distance calculation.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 6 is a block diagram of a phase of execution of the system of the invention;

FIG. 7 is a flow diagram showing the execution of a part of the phase of execution of FIG. 6;

FIG. 8 is a flow diagram showing the execution of a different part of the phase of execution of FIG. 6;

DETAILED DESCRIPTION

Figure 1:
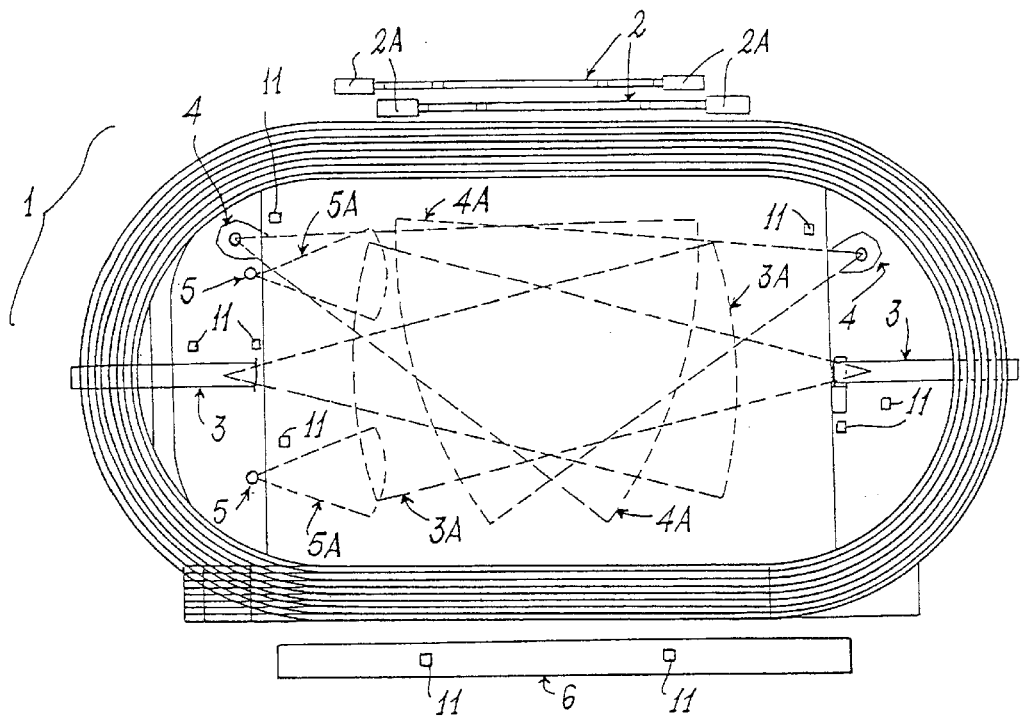
FIG. 1 is a top view of a surface for performing athletics events in which distances are measured by the system of the invention.

With reference to FIG. 1, a surface on which athletic events take place is indicated overall by 1. It includes acceleration tracks 2 for the long jump and triple jump, acceleration tracks 3 for javelin throwing, footboards 4 for throwing the discus and hammer, and footboards 5 for shot putting. Dashed lines indicate the landing surfaces (3A, 4A and 5A respectively) for the implements thrown. The pits (containing sand) in which the athletes land after the long jump and triple jump are indicated by 2A.

A structure to the side of the surface 1 is indicated by 6. The structure 6 can be a raised bank to the side of a usual athletic track 7 or contain stands for the public watching the sports events.

According to the invention, a system 10 (FIGS. 2–5) is provided to determine the extent, distance or trajectory of the flight undergone by a sports implement (for example a discus or javelin) or by an athlete who has jumped (for example a long jump).

Specifically, the system 10 comprises at least one video camera 11 (or equivalent image acquisition device, such as an infrared sensor or the like) located in a fixed position on one side of the landing surface 2A, 3A, 4A or 5A. The video camera 11 can be positioned close to this surface, as in the case of a long jump pit in which the video camera is positioned for example between 1 and 3 meters from this pit, or at a slightly greater distance, as in the case of the landing surface 5A in shot putting events in which the video camera is positioned for example between 5 and 10 meters or more from this surface, or at a great distance from it as in the case of the surfaces 3A and 4A at which javelin throwing, discus throwing or shot putting events occur. In this case, the video camera 11 is positioned preferably between 20 and 40 meters or more from the surface. In all cases the lens 12 of the video camera has such an aperture or such a shape as to capture a wide and adequate extent of the landing surface at which the image acquisition device is aimed. This extent is preferably chosen on the basis of data relative to throw or jump trajectories of the athletes participating in the event. For example in the case of the long jump, if the athletes participating in the event are accredited with jumps all lying within the range of 7 to 9 meters, the video camera is aimed at a distance of 8 meters from the usual jumping footboard (indicated by 13 in FIGS. 2 and 5) and has a lens aperture such as to embrace that part of the pit distant 6.5 to 9.5 meters from the footboard 13.

Figure 3:
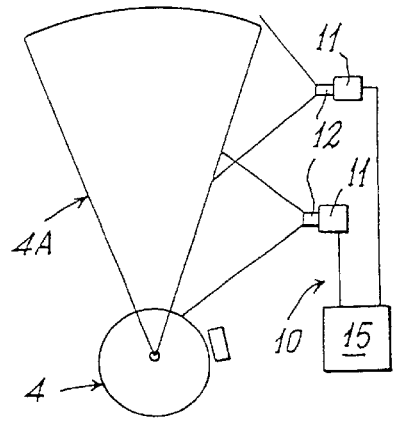
FIG. 3 is a top view of a surface for a hammer throwing event in which measurements are taken by the system of the invention.

Similar conditions apply in identifying the landing areas of the surfaces 3A, 4A and 5A. As these latter have a wide extension, preferably two spaced-apart video cameras are used to acquire the image (as shown in FIGS. 1 and 3).

The image acquisition device (i.e., each video camera 11) is connected to an image processing unit to enable the propelled distance of the body on landing to be measured. This image processing unit, shown generally as 15 in the figures, may comprise one or more image recorders, ports for receiving the recorded images, an image conversion device, and a personal computer (PC) or microprocessor suitably programmed to perform image and data processing.

Figure 2:
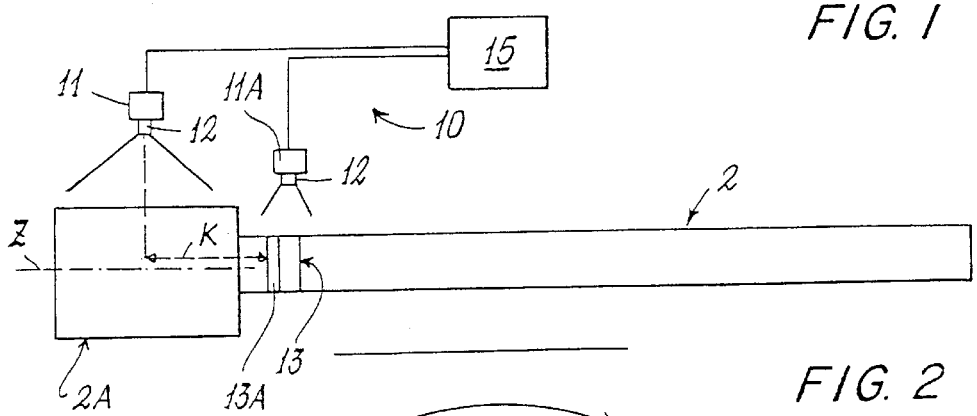
FIG. 2 is a top view of a surface for the long jump in which measurements are taken by the system of the invention.
Figure 4:
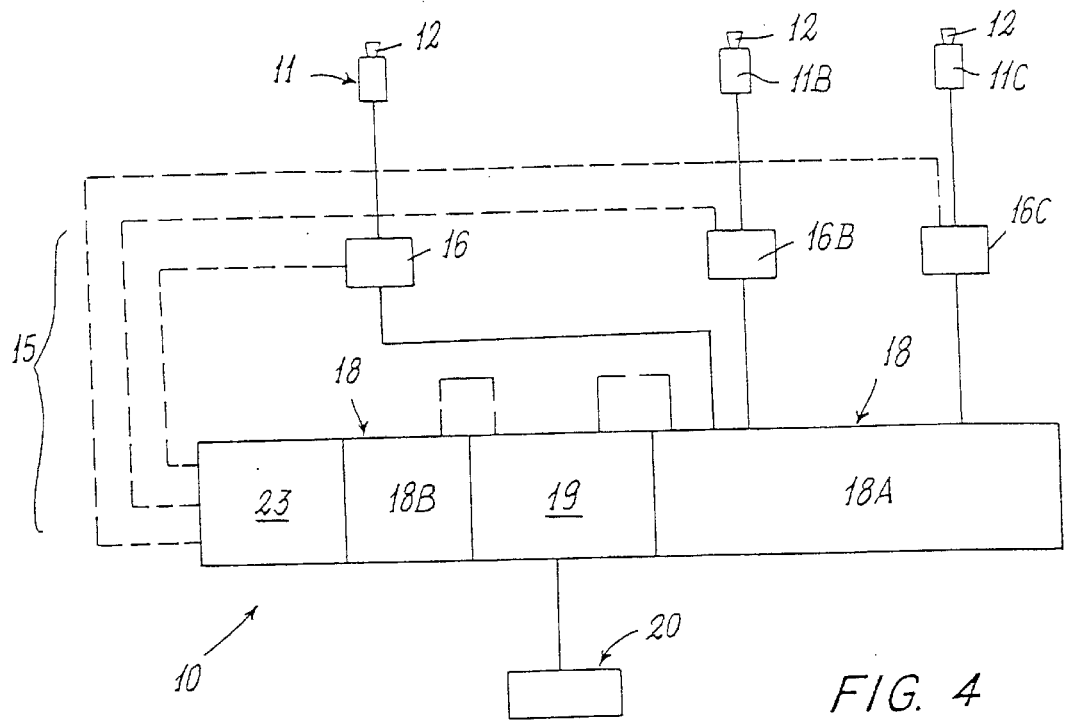
FIG. 4 is a schematic block diagram of the system of the invention.
Figure 5:
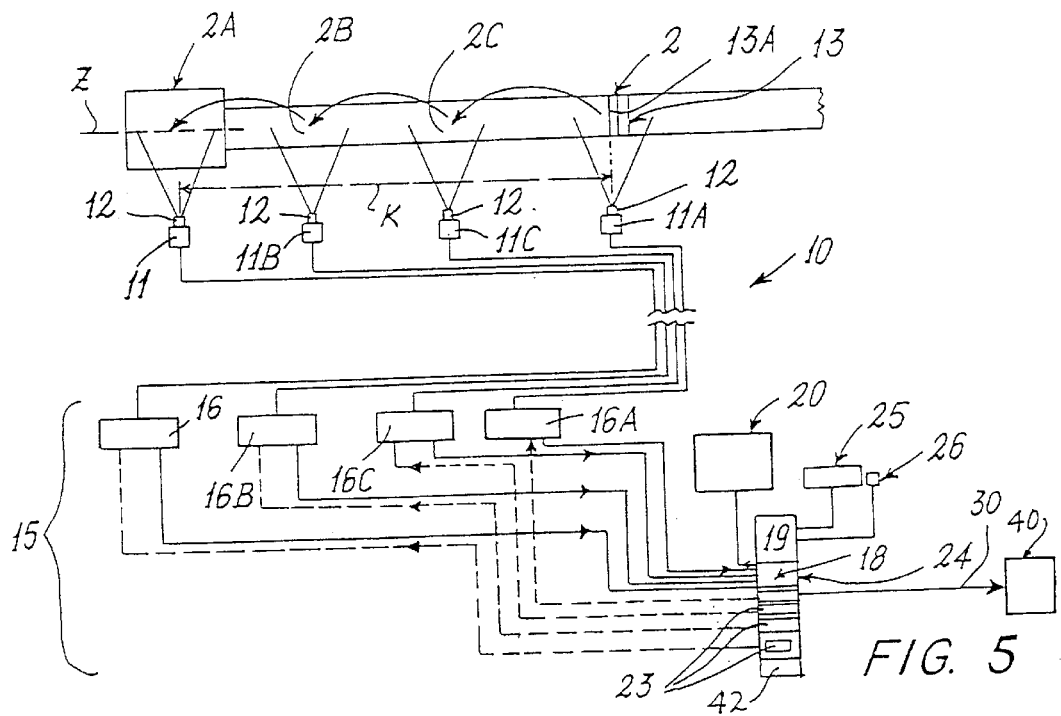
FIG. 5 is a schematic block diagram of the system of the invention used in a triple jump event.

With reference to FIGS. 2, 4, and 5, these show an embodiment of the invention used for measuring a long jump and triple jump. In the example, a first video camera 11 is positioned in correspondence with the pit or landing surface 2A, and another video camera 11A is positioned in correspondence with the jumping footboard 13 to record the exact point at which the athlete's foot separates from it. This is useful for measuring the true length of the athlete's jump. This measurement cannot be obtained using the measuring device currently used in sports activities.

The video camera 11 is positioned at a known distance K from the footboard (acting as an index line) and is connected to an image recording member 16 of the image processing unit 15. The image recording member(s), shown in FIGS. 4 and 5, are preferably of a digital type. The video camera 11A is connected to a similar digital video-recorder 16A, as shown in FIG. 5, for example. In the case of a triple jump, an additional two video cameras 11B and 11C are provided to acquire the image of landing areas 2B and 2C between the pit 2A and the footboard 13, the athlete landing on such areas during the triple jump. The video cameras 11B and 11C are also connected to corresponding video-recorders (preferably digital) 16B and 16C. All the video-recorders provided are mutually synchronized to the same time base.

Each image recording device 16, 16A, 16B and 16C is connected to image processing device 18 that retransforms the recorded data into signals for conversion into images by image conversion device 19, which is connected to a monitor 20. Referring to FIG. 4, the image processing device 18 includes a video card 18A connected to one or more recording devices via its own serial port and a video signal mixer or selector 18B also connected via a serial port 23 to the corresponding recording device(s). The image conversion device 19 is an image converter connected to the monitor 20.

The devices 18 and 19 are connected to a microprocessor unit 24 (FIG. 5) that connects to the serial communication ports 23 and through which the microprocessor controls the video-recorders 16, 16A, 16B. The microprocessor unit 24 is connected to a keyboard 25, to a mouse 26, to the monitor 20, and to a display unit 40.

The microprocessor unit 24 can also be provided with an optical aberration compensation device (not shown), for example a digital view-finder, which can modify the parameters and/or the images of the landing surface from which the image is acquired so as not to be affected by any light or light-dark zone reverberations.

The microprocessor unit 24 is connected via an output 30 to display unit 40 that displays the measurement results and/or to a television control room connected to a telecommunication or remote image transmission network by which images of the athletics event are fed into a television circuit together with the data relative to the measurements effected. These latter can be directly displayed by suitable known video techniques directly on the images originating from one of the television cameras filming the event.

The method of performing the measurement of the present invention is described with reference to FIGS. 6 to 9.

FIG. 6 shows a block diagram flow of the method for measuring the propelled distance of the body that has undergone an aerial trajectory between a take-off area (for example the footboard 13) and the landing area within the surface 2A.

An operator operates the keyboard 25 or the mouse 26 (block 60, FIG. 6) to select the type of event (jump or throw) that is to be measured. The operator then selects (block 61) the method of operating the system, i.e., whether in setting-up mode (shown in FIG. 7) or in live distance measurement mode, i.e., measurement during an event (FIG. 8). Once the mode is selected, the operator initiates execution of the mode (block 62) to achieve the desired setting-up or measurement. This mode execution is also described in FIGS. 7 and 8. The procedure then terminates (block 63).

Figure 9:
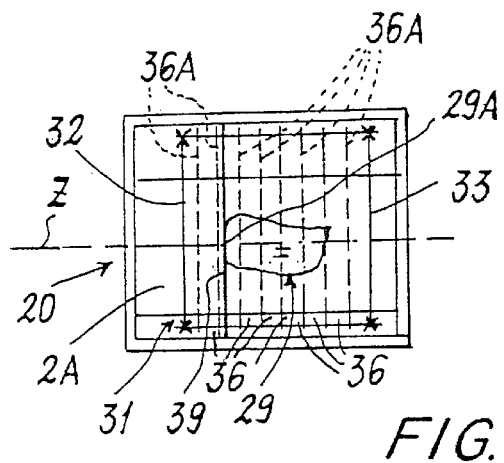
FIG. 9 is a schematic video representation of a sports event in which the system of the invention is used.

Specifically, the setting-up mode (see FIG. 7) comprises selecting the number of documents present in a memory 42 of the microprocessor unit 24, (block 71, FIG. 7). These documents refer, for example, to a plurality of images of the long jump pit 2A (shown on the monitor 20 as represented in FIG. 9) after a jump. The stored image represents the impression 29 that is formed on the pit 2A after the athlete has landed.

A decision is then made (block 72) whether a real or a virtual measurement of the jump is to be calculated, or if the distance from the point of landing of the athlete from the index line is to be calculated, or if the distance between the landing point and the actual point of separation of the athlete from the footboard is to be calculated.

If the measurement is to be virtual, the setting-up mode updates the number of documents in the memory by increasing it by one (block 73). If the calculation is to be real, it chooses the document already in the memory (block 74) and sets it up (block 75). Setting-up comprises enclosing the landing area present on the surface or pit 2A within a matrix, for example of quadrilateral form 31 created on the monitor 20 by using the mouse 26 or a usual line selection algorithm fed into the microprocessor unit 24. The quadrilateral has two end sides 32 and 33 parallel to each other and to the impassable jump line located on the jumping footboard 13 (the line is indicated by 13A in FIGS. 2 and 5). The distance of the line 13A from these sides is defined and stored in memory 42 of the microprocessor unit 24. In the described embodiment of the invention, the area of the quadrilateral or matrix 31 is divided into several bands or lines 36 parallel to each other and to the sides 32 and 33, of known width (measured along the longitudinal axis Z of the landing surface). Each band width is stored in the memory of the unit 24 to identify the distance between the side 36A of each band and the side 32. The matrix 31 could also have another form, for example in rows and columns or by only the end lines 32 and 33.

Having done this, a check is made to determine whether further setting-up is required (block 76), after which the procedure returns to block 74 or the setting up terminates (block 77).

If instead the measurement is to be real, i.e., the measurement is to be calculated during a jumping event (for example), the procedure is as follows.

At the commencement of the jump, during the athlete's warm-up, the recording devices 16, 16A, 16B, 16C and 16D are activated, and in particular the device 16 associated with the video camera positioned to the side of the pit 2A (block 80 of FIG. 8). When the jump has been made, the procedure halts (block 81) recording of the image acquired by the video camera or video cameras (for example the video camera 11 positioned at the pit 2A). The image is displayed on the monitor as a still image (block 82). Then, using a vertical cursor 39 (described hereinafter), the band 36 in which the near end 29A of the impression 29 (closer to the footboard 13) lies is identified (block 83). The vertical cursor 39, which is movable on the monitor 20 parallel to the sides 32 and 33 and to each band side 36A is positioned on this end 29A. Block 84 then verifies that the selected band does not have to be corrected (i.e., that the end 29A lies inside the quadrilateral 31). The microprocessor 24 then proceeds to calculate the measurement (block 85) by adding the pre-stored distance between the side 32 and the line 13A to the distance between the end 29A (identified by the line 39) and the side 32. The microprocessor unit 24, using calculation algorithms that will be readily apparent to one having ordinary skill in the programming art, executes this calculation. This calculation yields the distance of the end 29A or landing point from the take-off area (line 13A).

All this is achieved in real time within a few seconds (2–4 seconds) from the moment in which the athlete lands.

The procedure then checks whether another measurement is to be effected (block 86), in which case it returns to block 82. If the event has terminated it leaves this described mode of operation (block 87).

The invention provides certainty of measurement, which is effected by a data processing device operated by knowledgeable personnel, without the measurement being made by competition judges who are hence freed from the commitments of this operation and the risk of error.

The measurement is made without the need for any presence on the competition ground and without any possibility of the measurement being influenced by such presence.

The mode of operation for measuring a long jump has been described. A throw of an implement (discus, shot, hammer or javelin) or a triple jump can be likewise measured using the same mode of operation, and following the schemes of FIGS. 6, 7 and 8.

In this respect it should be noted that using the system of the invention, by positioning the video cameras 11A, 11B and 11C beside the areas 2B, 2C of the track 2 and at the footboard 13, the length of the intermediate jumps of a triple jump athlete can be measured. The methods for obtaining these measurements is identical to those already described with reference to FIGS. 6, 7 and 8 and are therefore not further described.

Measurement of the intermediate jumps is not possible with the state of the art instruments used up to the present time for measuring distances in athletics. Such a measurement can enable an athlete to obtain data relative to these intermediate jumps and hence be able to achieve improvement (for example by making intermediate jumps of greater or lesser length in order to effect the final jump in such a manner as to land as far as possible from the footboard 13). By knowing the intermediate jumps of their adversaries, an athlete can also understand their competition strategy and possibly adapt it if this strategy leads to victory.

Figure 10:
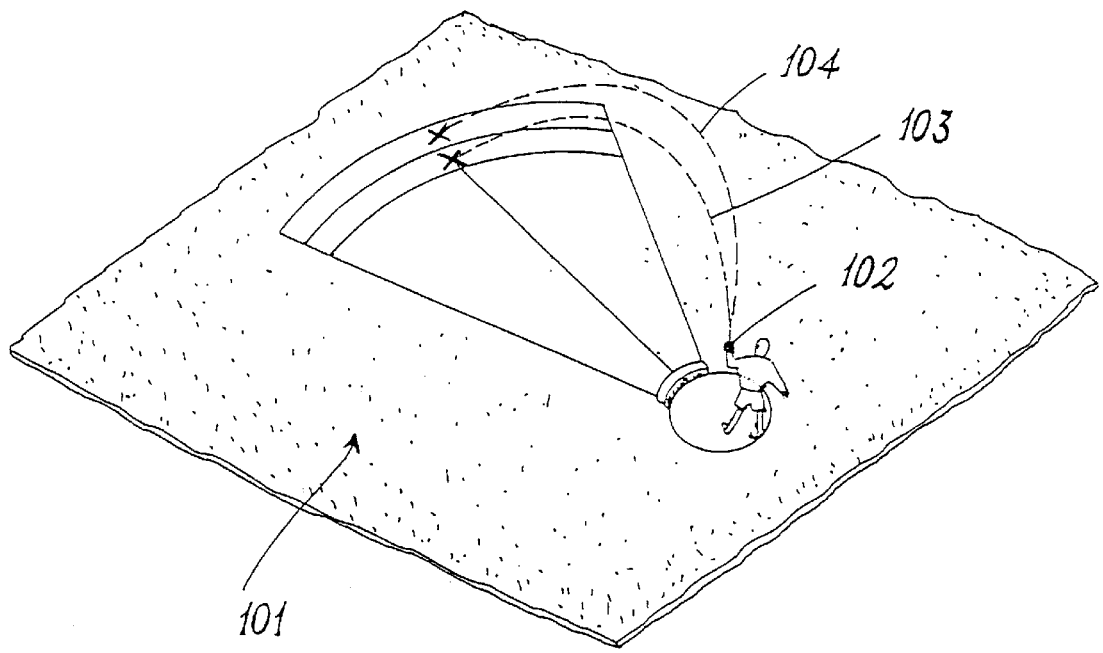
FIG. 10 is a schematic view of a competition field in which an implement or body effects a trajectory which is measured in accordance with the invention.

Moreover, the system of the invention as used to calculate the thrown distance of a javelin or discus also enables its flight stability to be verified, enables any wind force influencing the implements to be detected (which, for example, may lead to a poor result), and enables the manner of throwing to be determined (again to enable the athlete to improve his technique or to know the throwing techniques of his adversaries). This is achieved by virtue of the use of video cameras with image recording systems and three-dimensional processing. The use of the invention for this processing is illustrated in FIG. 10, which shows an event site 101, an implement 102, and an implement trajectory 103. The invention can check correspondence between this trajectory and an ideal trajectory 104, to achieve a throw leading to victory or medal result.

A particular embodiment of the invention applied to athletics has been described. The invention is however applicable to other sports. For example, the invention can be applied to golf to measure the distance and trajectory of a shot in order to examine the effectiveness of this shot, to enable the athlete to know the best tactics to use in attaining good results in a competition, and to understand the performance of the implements used (golf club, ball).

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A system for measuring the distance travelled by bodies in flight during sports events, the bodies executing trajectories having a common predetermined take-off area, and a variable landing point within a landing surface, the system comprising:

a fixed image acquisition device positioned at a predetermined distance from the take-off area for acquiring the image of the landing surface;

a recorder for recording the landing surface image at least from the moment of initiation of the flight to completion of the flight;

an identifying device for identifying a landing point of the body within the landing surface;

a calculating device for calculating the distance of the landing point from the take-off area;

an image processing device for receiving images from the recording device; and a monitor for receiving images from the image processing device;

wherein the image processing device comprises an image converter;

wherein the microprocessor is in communication with the monitor and controls the monitor to display the image of the landing surface, and the landing point of the body within the landing surface acquired by the image acquisition device within a calculation area generated on the monitor by the microprocessor unit; and wherein the microprocessor unit generates the calculation area comprising a matrix with at least parallel lines perpendicular to a longitudinal axis of the landing surface, an end line that lies on the monitor image in a position representing a predetermined distance from the take-off area, and a plurality of dividing lines separated from each other and the end line by a predetermined distance such that the distance between each portion of the landing area and the take-off area can be calculated.

2. A system as claimed in claim 1, wherein the identifying device comprises a cursor, and further comprising a control device for moving the cursor on the matrix displayed on the monitor to a near position on the landing point of the body, the microprocessor calculating the distance between the near position on the landing point and the end line to determine the distance travelled by the body.

3. A method for measuring the distance travelled by a body in flight during a sports competition, between a take-off area and a landing surface on which impact is made by the body at a landing point, comprising:

a) acquiring at least the image of the landing surface;

b) recording the acquired landing surface image starting at least from the moment in which the body commences flight;

c) representing the recorded landing surface image on a monitor as a still image;

d) enclosing the represented landing surface image on the monitor within a matrix;

e) defining a first distance from the take-off area to an end element of the matrix;

f) positioning a reference point on a landing point of the landing surface represented on the matrix;

g) calculating a second distance between the reference point and the end element and adding the second distance to the first distance to equal the distance travelled by the body in flight;

h) displaying the calculated distance travelled by the body in flight substantially immediately after the impact of the body on the landing surface.

4. A method as claimed in claim 3, comprising dividing the matrix into a plurality of defined dimension bands with end edges that are parallel to and a defined distance from the end element.

5. A method as claimed in claim 3, comprising acquiring and recording a plurality of separate image portions of the landing surface.

6. A method as claimed in claim 3, comprising acquiring and recording images of intermediate areas between the take-off area and the landing surface.

* * * * *